(12) United States Patent
Hou

(10) Patent No.: US 10,498,249 B1
(45) Date of Patent: Dec. 3, 2019

(54) SMART SINE WAVE STEP-DOWN CONVERTER

(71) Applicant: Guangdong BESTEK E-commerce Co., Ltd., Shenzhen (CN)

(72) Inventor: Tao Hou, Shenzhen (CN)

(73) Assignee: GUANGDONG BESTEK E-COMMERCE CO., LTD., Shenzhen (CN)

( * ) Notice: Subject to any disclaimer, the term of this patent is extended or adjusted under 35 U.S.C. 154(b) by 0 days.

(21) Appl. No.: 16/461,801

(22) PCT Filed: Feb. 28, 2017

(86) PCT No.: PCT/CN2017/075078
§ 371 (c)(1),
(2) Date: May 17, 2019

(87) PCT Pub. No.: WO2018/094897
PCT Pub. Date: May 31, 2018

(30) Foreign Application Priority Data

Nov. 25, 2016 (CN) .......................... 2016 1 1063620

(51) Int. Cl.
*H02M 5/458* (2006.01)
*H02M 1/08* (2006.01)

(52) U.S. Cl.
CPC ........... *H02M 5/458* (2013.01); *H02M 1/083* (2013.01)

(58) Field of Classification Search
None
See application file for complete search history.

(56) References Cited

U.S. PATENT DOCUMENTS 6,728,118 B1 4/2004 Chen et al.
10,097,109 B1 * 10/2018 Ye ..................... H02M 7/53871
(Continued)

FOREIGN PATENT DOCUMENTS

| CN | 101674004 A | 3/2010 |
| CN | 102005954 A | 4/2011 |
| CN | 102969905 A | 3/2013 |

OTHER PUBLICATIONS

International Search Report for PCT/CN2017/075078.
(Continued)

*Primary Examiner* — Jeffrey A Gblende

(57) ABSTRACT

A smart sine wave step-down converter is provided including: an input and rectifying unit; a high-frequency modulation unit including a first and a second switching tubes, the drain of the first switching tube being connected to an output terminal of the input and rectifying unit, the source of the first switching tube being connected to the drain of the second switching tube, the grids of the first and the second switching tubes being connected with two-path anti-phased PWM pulse signals; an inductance filtering unit including a inductor and a first capacitor, the front end of the inductor being connected to the source of the first switching tube; an inverting paraphase unit; a filter controlling unit including a third switching tube and an electrolytic capacitor having an anode connected to the output terminal of the input and rectifying unit and a cathode connected to the drain of the third switching tube.

10 Claims, 3 Drawing Sheets

(56) References Cited

U.S. PATENT DOCUMENTS

| | | | | |
|---|---|---|---|---|
| 2012/0155119 A1* | 6/2012 | Kim | ................. | H02M 3/33561 |
| | | | | 363/17 |
| 2016/0181918 A1* | 6/2016 | Herfurth | ................. | H02M 1/08 |
| | | | | 315/291 |
| 2016/0291682 A1* | 10/2016 | Herfurth | ............ | H05B 33/0803 |
| 2016/0294282 A1* | 10/2016 | Herfurth | ............... | H02M 3/157 |

OTHER PUBLICATIONS

International Publication for PCT/CN2017/075078.
Written Opinion of the International Search Authority for PCT/CN2017/075078.

* cited by examiner

SMART SINE WAVE STEP-DOWN CONVERTER

TECHNICAL FIELD

The present application relates to a voltage converter, in particular to a smart sine wave step-down converter.

BACKGROUND

The sine wave step-down converter, also known as a step-down travel platooninsert, is a sine wave AC/AC converter, where the function of step-down and stable voltage and frequency can be realized in the AC/AC transformation process. At present, most AC/AC portable devices in the market output modified waves, where the voltage is firstly rectified to a DC voltage by a step-down circuit, secondly stepped down by the BUCK and finally inverted to AC voltage to be provided for a load. However, such step-down converter mostly outputs a voltage presented as a modified wave, which is quite harmful to electrical devices, and meanwhile has a low efficiency and a large volume that is inconvenient for carrying.

SUMMARY

The technical problem to be solved by the present application is to provide a smart sine wave step-down converter having a good performance for step-down conversion, avoiding damage to a load and interference to the power grid, and being easy to carry.

The following technical scheme is used for solving the above-mentioned problem.

A smart sine wave step-down converter is provided, comprising: an input and rectifying unit connected to a mains voltage, which rectifies the mains voltage and then outputs a pulsating DC voltage; a high-frequency modulation unit including a first switching tube and a second switching tube, wherein the drain of the first switching tube is connected to an output terminal of the input and rectifying unit, the source of the first switching tube is connected to the drain of the second switching tube, the source of the second switching tube is earthed, and the grids of the first and second switching tubes are respectively connected with two-path anti-phased PWM pulse signals; an inductance filtering unit including a inductor and a first capacitor, wherein the front end of the inductor is connected to the source of the first switching tube, the first capacitor is connected between the back end of the inductor and the earth, when the first switching tube is on-switched and the second switching tube is off-switched, the pulsating DC voltage from the drain of the first switching tube is filtered to filter out the high-frequency wave via the inductor and then is output from the back end of the inductor, and when the first switching tube is off switched and the second switching tube is on-switched, an electromotive force generated from the back end of the inductor is released from the first capacitor, through the second switch tube to the front end of the inductor, and the voltage of the back end of the inductor is stepped down to a preset value by adjusting the duty ratio of the two-path PWM pulse signals respectively loaded on the grid of the first switching tube and the grid of the second switching tube; an inverting paraphase unit including an input terminal connected to the back end of the inductor, wherein the inverting paraphase unit is configured to invertedly convert a pulsating DC voltage outputted from the back end of the inductor to a sine AC voltage having positive and negative half cycles; a filter controlling unit including an electrolytic capacitor and a third switching tube, wherein the electrolytic capacitor has an anode connected to the output terminal of the input and rectifying unit and a cathode connected to the drain of the third switching tube, and the source of the third switching tube is earthed, wherein when the mains voltage connected to the input and rectifying unit does not exceed a preset value, the voltage of the grid of the third switching tube is lowered to off switch the third switching tube; and wherein when the mains voltage connected to the input and rectifying unit exceeds the preset value, a driving voltage is loaded to the grid of the third switching tube to on-switch the third switching tube, and the voltage output from the input and rectifying unit is filtered by the electrolytic capacitor.

Preferably, the first switching tube, the second switching tube and the third switching tube are N-channel MOS tubes.

Preferably, the smart sine wave step-down converter further comprises an MCU controlling unit, wherein the grid of the first switching tube, the grid of the second switching tube, the grid of the third switching tube and the control terminal of the inverting paraphase unit are respectively connected to the MCU controlling unit, and the MCU controlling unit outputs the two-path anti-phased PWM pulse signals to the grid of the second switching tube and the grid of the third switching tube, controls the on/off state of the third switching tube and controls the inverting paraphase unit to execute conversion.

Preferably, the smart sine wave step-down converter further comprises an AC sampling unit, wherein the AC sampling unit comprises an input terminal connected to the input and rectifying unit and an output terminal connected to the MCU controlling unit, the AC sampling unit is configured to collect a voltage value and a phase of the mains voltage and then transmit them to the MCU controlling unit, the MCU controlling unit is configured to control the inverting paraphase unit to execute inversion according to the phase of the mains voltage collected by the AC sampling unit so that the inverting paraphrase unit outputs the sine AC voltage having the same phase as the mains voltage, and is configured to determine whether the mains voltage exceeding the preset value according to the voltage value collected by the AC sampling unit: if the preset value is exceeded, the MCU controlling unit loads the two-path anti-phased PWM pulse signals to the grid of the first switching tube and the grid of the second switching tube respectively, and loads the driving voltage to the grid of the third switching tube; if the preset value isn't exceeded, the MCU controlling unit controls the first switching tube to maintain on-switched, and lowers the voltage of the grid of the third switching tube.

Preferably, when determining that the mains voltage exceeds the present value, the MCU controlling unit controls the third switching tube to be on-switched at the zero-crossing point of the mains voltage according to the phase of the mains voltage collected by the AC sampling unit.

Preferably, the AC sampling unit comprises an operational amplifier and a comparator, two input terminals of the operational amplifier are respectively connected to the live and zero lines of the input and rectifying unit via their corresponding current-limiting sampling resistors, and the output terminal of the operational amplifier is connected to the MCU controlling unit so that the voltage value of the mains voltage is obtained after the MCU controlling unit calculating the voltage signal output from the operational amplifier.

Preferably, the output terminal of the operational amplifier is further connected to the anti-phased terminal of the comparator, the in-phased terminal of the comparator is connected to a reference voltage, and the output terminal of the comparator is connected to the MCU controlling unit, and the MCU controlling unit is configured to obtain the phase of the mains voltage according to the voltage signal output from the comparator.

Preferably, the back end of the inductor is connected to a voltage sampling unit that has an output terminal connected to the MCU controlling unit, and the voltage sampling unit is configured to collect the DC voltage outputted from the back end of the inductor and then transmit it to the MCU controlling unit.

Preferably, the smart sine wave step-down converter further comprises a current sampling unit which comprises a current transformer, wherein the primary winding of the current transformer is connected between the front end of the inductor and the source of the first switching tube, and the current signal of the secondary winding of the current transformer is rectified and then transmitted to the MCU controlling unit, wherein the MCU controlling unit controls both the first switching tube and the second switching tube to be cut-off when the current of the secondary winding of the current transformer exceeds a preset value.

Preferably, the inverting paraphase unit comprises an inverter bridge comprising a fourth switching tube, a fifth switching tube, a sixth switching tube and a seventh switching tube, wherein the grid of the fourth switching tube, the grid of the fifth switching tube, the grid of the sixth switching tube and the grid of the seventh switching tube are respectively connected to the MCU controlling unit, and the MCU controlling unit is configured to control the fourth switching tube, the fifth switching tube, the sixth switching tube and the seventh switching tube to be on-switched or off-switched in order to the inverting paraphrase unit output the sine AC voltage.

In the smart sine wave step-down converter according to the present application, the input and rectifying unit rectifies the mains voltage and outputs the DC voltage to be loaded on the drain of the first switching tube. During on work, the first switching tube and the second switching tube are alternately on-switched by the grid of the first switching tube and the grid of the second switching tube respectively connected to the two-path anti-phased PWM pulse signals. When the first switching tube is on-switched, the DC voltage is transmitted through the first switching tube and the inductor in turn. When the second switching tube is on-switched, the inductor generates the self-inductance by the voltage mutation, such that the electromotive force generated from the back end of the filtering inductor is released through a loop formed by the back end of the inductor, the first capacitor, the second switching tube and the front end of the inductor. The output voltage of the inductor is stepped down by repeating the above-mentioned process. In the process mentioned above, the on-switched time of the first switching tube can be adjusted by adjusting the duty ratio of the two-path PWM pulse signals. The shorter the on-switched time of the first switching tube is, the lower the output voltage of the inductor is, so that the smart step-down conversion of the sine wave is realized. On this basis, the connecting state of the electrolytic capacitor can be controlled by on-switching or off-switching the third switching tube. In the case that the mains voltage does not exceed the preset value and thus meets the loading requirement, the step-down conversion is not required and the electrolytic capacitor is off-switched. In the case that the mains voltage exceeds the preset value, the electrolytic capacitor is on-switched, and the half-wave DC voltage output from the input and rectifying unit is rectified by the electrolytic capacitor so that the back end of the inductor outputs a smoother and more stable pulsating DC voltage to be loaded on the inverting paraphase unit which outputs a stable and reliable sine AC voltage for power supply. Based on the above mentioned principles, the smart sine wave step-down converter according to the present application has a good performance for step-down conversion, outputs a stable and reliable voltage, avoids damage to a load and interference to the power grid, and is easy to carry.

DETAILED DESCRIPTION

The present application would be described in greater detail with reference to the drawings and embodiments.

Figure 1:
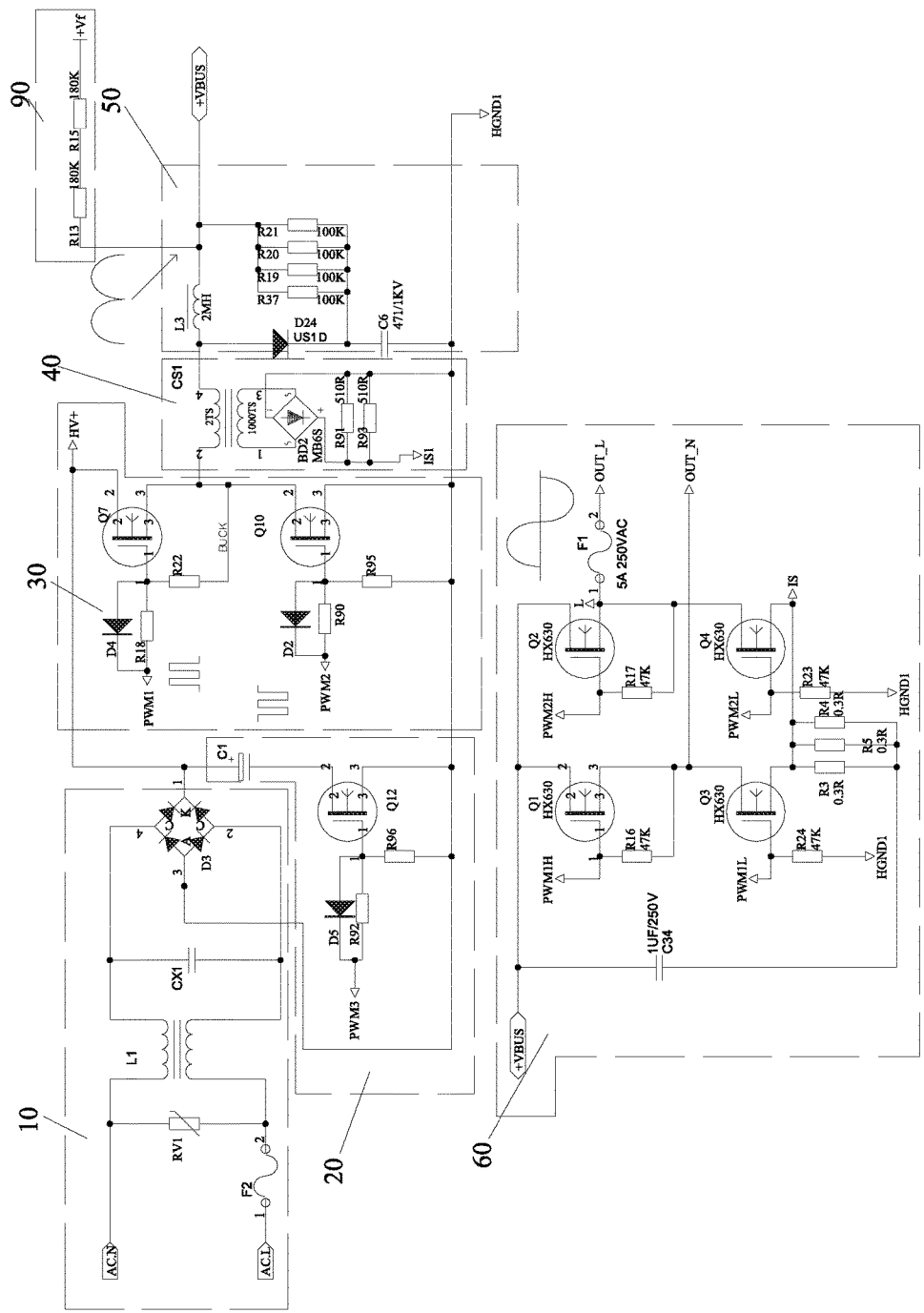
FIG. 1 is a schematic circuit diagram of a smart sine wave step-down converter in accordance with an exemplary embodiment.
Figure 2:
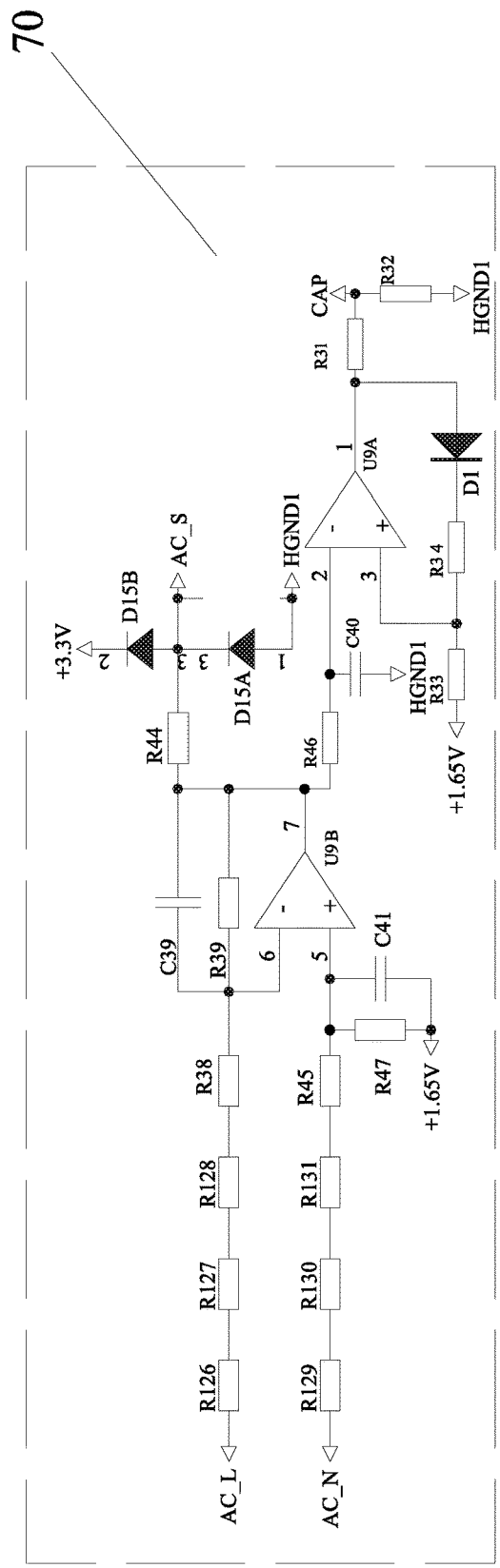
FIG. 2 is a schematic circuit diagram of an AC sampling unit of the smart sine wave step-down converter of FIG. 1.
Figure 3:
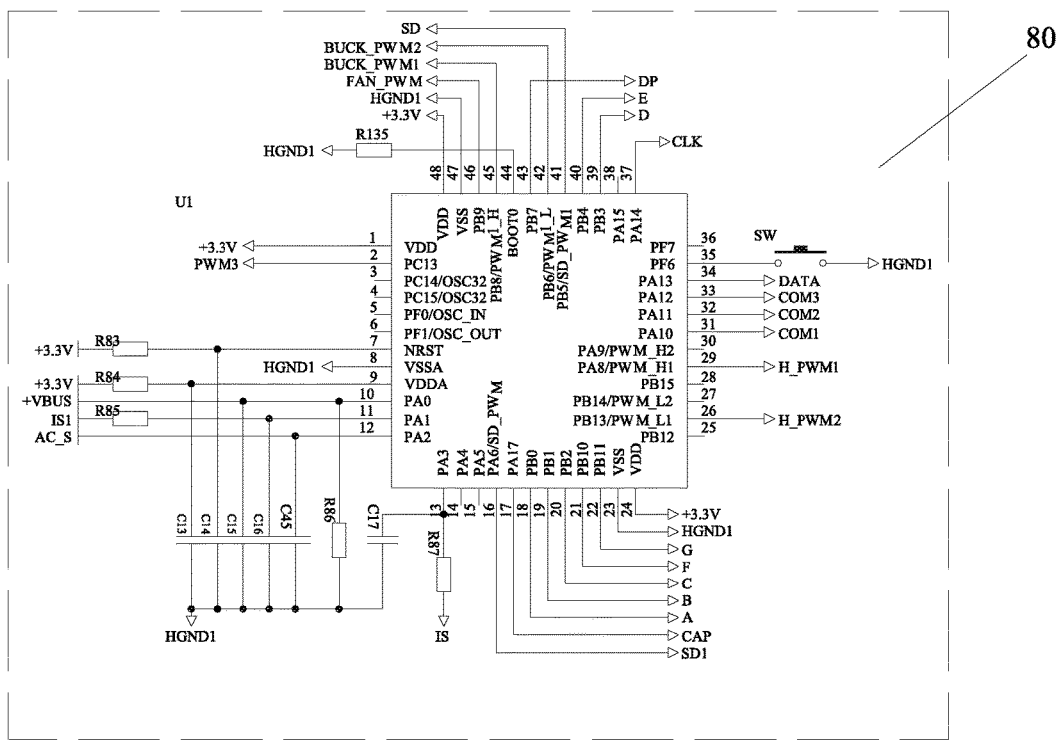
FIG. 3 is a schematic circuit diagram of an MCU controlling unit of the smart sine wave step-down converter of FIG. 1.

A smart sine wave step-down converter is disclosed in accordance with the present application, as is shown in FIGS. 1-3, including:

an input and rectifying unit 10 connected to a mains voltage, which rectifies the mains voltage and then outputs a pulsating DC voltage;

a high-frequency modulation unit 30 including a first switching tube Q7 and a second switching tube Q10, wherein the drain of the first switching tube Q7 is connected to an output terminal of the input and rectifying unit 10, the source of the first switching tube Q7 is connected to the drain of the second switching tube Q10, the source of the second switching tube Q10 is earthed, and the grids of the first and second switching tubes Q7, Q10 are respectively connected with two-path anti-phased PWM pulse signals;

an inductance filtering unit 50 including an inductor L3 and a first capacitor C34, wherein the front end of the inductor L3 is connected to the source of the first switching tube Q7, and the first capacitor C34 is connected between the back end of the inductor L3 and the earth, when the first switching tube Q7 is on-switched and the second switching tube Q10 is off-switched, the pulsating DC voltage from the drain of the first switching tube Q7 is filtered to filter out the high-frequency wave via the inductor L3, and then is output from the back end of the inductor L3, and when the first switching tube Q7 is off-switched and the second switching tube Q10 is on-switched, an electromotive force generated from the back end of the inductor L3 is released from the first capacitor C34, through the second switch tube Q10 to the front end of the inductor L3, the voltage of the back end of the inductor L3 is stepped down to a preset value by adjusting the duty ratio of the two-path PWM pulse signals respectively loaded on the grid of the first switching tube Q7 and the grid of the second switching tube Q10;

an inverting paraphase unit 60 including an input terminal connected to the back end of the inductor L3, wherein the inverting paraphase unit 60 is configured to invertedly convert a pulsating DC voltage outputted from the back end of the inductor L3 to a sine AC voltage having positive and negative half cycles;

a filter controlling unit 20 includes an electrolytic capacitor C1 and a third switching tube Q12, wherein the electrolytic capacitor C1 has an anode connected to the output terminal of the input and rectifying unit 10 and a cathode connected to the drain of the third switching tube Q12. The source of the third switching tube Q12 is earthed;

when the mains voltage connected to the input and rectifying unit 10 does not exceed a preset value, the voltage of the grid of the third switching tube Q12 is lowered to off-switch the third switching tube Q12;

when the mains voltage connected to the input and rectifying unit 10 exceeds the preset value, a driving voltage is loaded to the grid of the third switching tube Q12 to on-switch the third switching tube Q12, and the voltage output from the input and rectifying unit 10 is filtered by the electrolytic capacitor C1.

The working principle of the smart sine wave step-down converter above mentioned is: the input and rectifying unit 10 rectifies the mains voltage and outputs the DC voltage to be loaded on the drain of the first switching tube Q7. During on work, the first switching tube Q7 and the second switching tube Q10 are alternately on-switched by the grid of the first switching tube Q7 and the grid of the second switching tube Q10 respectively connected to the two-path anti-phased PWM pulse signals. When the first switching tube Q7 is on-switched, the DC voltage is transmitted through the first switching tube Q7 and the inductor L3 in turn. When the second switching tube Q10 is on-switched, the inductor L3 generates the self-inductance by the voltage mutation, such that the electromotive force generated from the back end of the filtering inductor L3 is released through a loop formed by the back end of the inductor L3, the first capacitor C34, the second switching tube Q10 and the front end of the inductor L3. The output voltage of the inductor L3 is stepped down by repeating the above-mentioned process. In the process mentioned above, the on-switched time of the first switching tube Q7 can be adjusted by adjusting the duty ratio of the two-path PWM pulse signals. The shorter the on-switched time of the first switching tube Q7 is, the lower the output voltage of the inductor L3 is, so that the smart step-down conversion of the sine wave is realized. On this basis, the connecting state of the electrolytic capacitor C1 can be controlled by on-switching or off-switching the third switching tube Q12. In the case that the mains voltage does not exceed the preset value and thus meets the loading requirement, the step-down conversion is not required and the electrolytic capacitor C1 is off-switched. In the case that the mains voltage exceeds the preset value, the electrolytic capacitor C1 is on-switched, and the half-wave DC voltage output from the input and rectifying unit 10 is filtered by the electrolytic capacitor C1 so that the back end of the inductor L3 outputs a smoother and more stable pulsating DC voltage to be loaded on the inverting paraphase unit 60 which outputs a stable and reliable sine AC voltage for power supply. Based on the above mentioned principles, the smart sine wave step-down converter according to the present embodiment has a good performance for step-down conversion, outputs a stable and reliable voltage, avoids damage to a load and interference to the power grid, and is easy to carry.

In the present embodiment, the first switching tube Q7, the second switching tube Q10 and the third switching tube Q12 are N-channel MOS tubes.

Referring to FIGS. 1-3, in order to better realize smart control, the smart sine wave step-down converter according to the present embodiment further includes an MCU controlling unit 80. The grid of the first switching tube Q7, the grid of the second switching tube Q10, the grid of the third switching tube Q12 and the control terminal of the inverting paraphase unit 60 are respectively connected to the MCU controlling unit 80. The MCU controlling unit 80 outputs the two-path anti-phased PWM pulse signals to the grid of the second switching tube Q10 and the grid of the third switching tube Q12, controls the on/off state of the third switching tube Q12 and controls the inverting paraphase unit 60 to execute conversion. Furthermore, the MCU controlling unit 80 includes a single-chip microcomputer U1 and its peripheral circuit.

In practical use, in terms of the step-down travel platooninserts, the step-down conversion is required only when the step-down travel platooninserts are applied to the environment of higher mains voltage. Therefore, it is necessary to sample and determine the AC mains voltage. In order to conveniently sampling the mains voltage, the smart sine wave step-down converter according to the present embodiment further includes an AC sampling unit 70. The input terminal of the AC sampling unit 70 has an input terminal connected to the input and rectifying unit 10 and an output terminal connected to the MCU controlling unit 80. The AC sampling unit 70 is configured to collect a voltage value and a phase of the mains voltage and then transmit them to the MCU controlling unit 80. The MCU controlling unit 80 is configured to control the inverting paraphase unit 60 to execute inversion according to the phase of the mains voltage collected by the AC sampling unit 70 so that the inverting paraphrase unit 60 outputs the sine AC voltage having the same phase as the mains voltage, and is configured to determine whether the mains voltage exceeding the preset value according to the voltage value collected by the AC sampling unit 70, if the preset value is exceeded, the MCU controlling unit 80 loads the two-path anti-phased PWM pulse signals to the grid of the first switching tube Q7 and the grid of the second switching tube Q10 respectively, and loads the driving voltage to the grid of the third switching tube Q12;

if the preset value isn't exceeded, the MCU controlling unit controls the first switching tube Q7 to maintain on-switched, and lowers the voltage of the grid of the third switching tube Q12.

Further, when determining that the mains voltage exceeds the present value, the MCU controlling unit 80 controls the third switching tube Q12 to be on-switched at the zero-crossing point of the mains voltage according to the phase of the mains voltage collected by the AC sampling unit 70.

On the basis of the above property, the electrolytic capacitor C1 can be on-switched in time, and the filtered voltage is smoother and more stable. When the MCU control unit 80 controls the inverting paraphase unit 60, the sine table can be directly called for inversion control as the DC power is stable. At this time, the inverting paraphase unit 60 outputs a more standard sine AC voltage, thereby improving the voltage conversion performance of the smart sine wave step-down converter according to the present application.

With respect to the specific composition of the AC sampling unit 70, the AC sampling unit 70 includes an operational amplifier U9B and a comparator U9A, two input terminals of the operational amplifier U9B are respectively connected to the live and zero lines of the input and rectifying unit 10 via their corresponding current-limiting sampling resistors, and the output terminal of the operational amplifier U9B is connected to the MCU controlling unit 80 so that the voltage value of the mains voltage is obtained after the MCU controlling unit 80 calculating the voltage signal output from the operational amplifier U9B. The output terminal of the operational amplifier U9B is further connected to the anti-phased terminal of the comparator U9A, the in-phased terminal of the comparator U9A is connected to a reference voltage, and the output terminal of the comparator U9A is connected to the MCU controlling unit 80. The MCU controlling unit 80 is configured to obtain the phase of the mains voltage according to the voltage signal output from the comparator U9A.

In the case that step-down conversion is not required, the first switching tube Q7 maintains on-switched, and the third switching tube Q12 is off-switched. The AC sampling unit 70 performs the phase sample while the mains AC voltage is subjected to voltage sampling. Based on the change of the phase, the MCU controlling unit 80 can correspondingly control the conversion frequency of the inverting paraphase unit 60 so that the inverse voltage output from the inverting paraphase unit 60 is the same as that of the mains AC voltage, thereby achieving a higher PF value and reducing interference to the power grid.

In order to achieve an output sample, the back end of the inductor L3 is connected to a voltage sampling unit 90 having an output terminal connected to the MCU controlling unit 80. The voltage sampling unit 90 is configured to collect the DC voltage outputted from the back end of the inductor L3 and then transmit it to the MCU controlling unit 80. It can be understood that the voltage sampling unit 90 may comprise two or more series sampling resistors.

In order to achieve over-current protection, the smart sine wave step-down converter further includes a current sampling unit 40 which includes a current transformer CS1. The primary winding of the current transformer CS1 is connected between the front end of the inductor L3 and the source of the first switching tube Q7. The current signal of the secondary winding of the current transformer CS1 is rectified and then transmitted to the MCU controlling unit 80. The MCU controlling unit 80 controls both the first switching tube Q7 and the second switching tube Q10 to be cut-off when the current of the secondary winding of the current transformer CS1 exceeds a preset value. The above preset values may be written in advance to the MCU controlling unit 80 for reference.

With respect to the composition of the inverting paraphase unit 60, the inverting paraphase unit 60 includes an inverter bridge comprising a fourth switching tube Q1, a fifth switching tube Q2, a sixth switching tube Q3 and a seventh switching tube Q4, The grid of the fourth switching tube Q1, the grid of the fifth switching tube Q2, the grid of the sixth switching tube Q3 and the grid of the seventh switching tube Q4 are respectively connected to the MCU controlling unit 80. The MCU controlling unit 80 is configured to control the fourth switching tube Q1, the fifth switching tube Q2, the sixth switching tube Q3 and the seventh switching tube Q4 to be on-switched or off-switched in order to the inverting paraphrase unit 60 output the sine AC voltage.

The above-described units are integrated to form a preferred embodiment of the present disclosure. The overall operation of the preferred embodiment is shown in FIGS. 1-3.

The grid voltage is filtered by an AC socket, an insurance F2, a lightning protection resistor RV1, a common mode suppression inductor L1 and a group filtering circuits CX1, and is rectified to be a half-wave AC voltage for output. The single-chip microcomputer U1 determines whether to activate a smart filtering circuit by an AC input voltage sampling circuit including R126, R127, R128, R38, R129, R130, R131, R45, C39, R39, R47, C41, U9, R44 and D15, and an AC input phase sampling circuit including R46, C40, R33, R34, D1, R31, R32.

In the filter controlling unit, the smart filtering circuit includes C1 and Q12. When the input voltage is equal to AC100-AC110, the smart filtering circuit is not activated and Q12 is off-switched. When the input voltage is higher than AC120V, PWM3 signals are output at the zero-crossing point of the grid voltage by the single-chip microcomputer UI, and transmitted to the gate of the Q12 via D5, R92 and R96 by means of a driving circuit. Q12 is on-switched and the cathode of C1 is connected to HGND1, such that the electrolytic capacitor starts to work and thus to filter the half-wave AC voltage rectified by D3 into the DC voltage.

As the step-down key part, the high-frequency modulation circuit includes Q7 and Q10. When the grid voltage is equal to AC100-AC110, the smart filtering circuit is not activated. At this time, the control signals PWM1 remain high by the single-chip microcomputer U1, and are transmitted to the gate of Q7 via D4, R8 and R22 by means of the driving circuit, and Q7 remains on-switched. When the grid voltage is higher than AC120V, the smart filtering circuit is activated. At this time, two high-frequency control signals PWM1, PWM2 output from the single-chip microcomputer U1 are transmitted to the gate of Q7 and the gate of Q10 respectively. PWM1 and PWM2 modulate the duty ratio of high-frequency PWM1 and PWM2 according to the sine set in the single-chip microcomputer, so that the modulated voltage and current change according to sinusoidal changes. Q7 and Q10 modulate the DC voltage filtered by C1 in the manner of high-frequency into a pulse voltage that changes in accordance with the sinusoidal change, and the conduction phases of Q7 and Q10 are inverted from each other by 180 degrees. The principle of specific step-down is: when Q7 is on-switched, the DC high voltage of C1 is transformed into a pulse level, and then the pulse level is stepped down by the inductor L3 of the filtering circuit. The inductor L3 forms a high impedance for the high-frequency voltage and current to step down so that the high voltage is converted to low voltage.

In the exemplary embodiment of the present disclosure, the high-frequency filter circuit includes the inductor L3. Q7 and Q10 modulate the DC voltage filtered by C1 in the manner of high-frequency into a pulse voltage that changes in accordance with the sinusoidal change, and L3 filters the modulated voltage into the half-wave AC voltage. If Q7 is on power-frequency mode, the filtering circuit does not work, which is equivalent to direct connection. The voltage filtered by L3 passes through the voltage sampling circuit including R13, R15 and then is transmitted to the single-chip microcomputer U1 so that the duty ratio of the PWM signals of Q7 and Q10 is determined by the single-chip microcomputer U1. That is to say, the high-frequency modulation circuit, the current sampling circuit, the filtering circuit and the voltage sampling circuit cooperatively form a closed loop to adjust the duty ratio of Q7 and Q10 to achieve a stable filtering output voltage.

As some extension functions, in the over-current protection circuit, a current sampling circuit including CS1, BD2, R91 and R93 samples the real time current, preventing the circuit from overcurrent damage.

The inverting paraphase circuit includes Q1, Q2, Q3 and Q4. A first output half-wave AC voltage through the filtering inductor L3 passes through Q1 and Q4 and is given to the load. A second output half-wave AC voltage through the filtering inductor L3 passes through Q2 and Q3 and is given to the load. In this way, a complete frequency AC voltage is formed on the load. The PWM signals output from the single-chip microcomputer U1 are driven by the driving circuit and then respectively sent the PWM1H, PWM2H, PWM1L, PWM2L signals to their corresponding gate of Q1, Q2, Q3, Q4. The phase of the inverting paraphase circuit has the following two situations. When the input voltage is higher than the grid voltage of 120V, the inverting paraphase circuit works according to the frequency set in the single-chip microcomputer. When the input voltage is equal to AC100-AC110, the phase of the inverting paraphase circuit is locked according to the phase taken by the input sampling circuit, that is to say, the frequency and the phase of the inverting paraphase circuit are consistent with the frequency and the phase of the input voltage.

The smart sine wave step-down converter is disclosed with small volume, light weight and easy to carry, can automatically adjust its output voltage within the input full voltage range, and output the output voltage in a pure sinusoidal mode, which automatically srectifies the AC voltage. At the same time, the smart sine wave step-down converter includes the voltage sampling circuit and the current sampling circuit, which are capable of preventing from surge voltage and current. Since the output voltage in a pure sinusoidal mode is suitable for various loads, the load is of strong compatibility.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A smart sine wave step-down converter, comprising:
an input and rectifying unit connected to a mains voltage, which rectifies the mains voltage and then outputs a pulsating DC voltage;
a high-frequency modulation unit comprising a first switching tube and a second switching tube, wherein the drain of the first switching tube is connected to an output terminal of the input and rectifying unit, the source of the first switching tube is connected to the drain of the second switching tube, the source of the second switching tube is earthed, and the grids of the first and second switching tubes are respectively connected with two-path anti-phased PWM pulse signals;
an inductance filtering unit comprising a inductor and a first capacitor, wherein the front end of the inductor is connected to the source of the first switching tube, the first capacitor is connected between the back end of the inductor and the earth, when the first switching tube is on-switched and the second switching tube is off-switched, the pulsating DC voltage from the drain of the first switching tube is filtered to filter out the high-frequency wave via the inductor and then is output from the back end of the inductor, and when the first switching tube is off switched and the second switching tube is on-switched, an electromotive force generated from the back end of the inductor is released from the first capacitor, through the second switch tube to the front end of the inductor, and the voltage of the back end of the inductor is stepped down to a preset value by adjusting the duty ratio of the two-path PWM pulse signals respectively loaded on the grid of the first switching tube and the grid of the second switching tube;
an inverting paraphase unit comprising an input terminal connected to the back end of the inductor, wherein the inverting paraphase unit is configured to invertedly convert a pulsating DC voltage outputted from the back end of the inductor to a sine AC voltage having positive and negative half cycles;
a filter controlling unit comprising an electrolytic capacitor and a third switching tube, wherein the electrolytic capacitor has an anode connected to the output terminal of the input and rectifying unit and a cathode connected to the drain of the third switching tube, and the source of the third switching tube is earthed, wherein
when the mains voltage connected to the input and rectifying unit does not exceed a preset value, the voltage of the grid of the third switching tube is lowered to off-switch the third switching tube;
when the mains voltage connected to the input and rectifying unit exceeds the preset value, a driving voltage is loaded to the grid of the third switching tube to on-switch the third switching tube, and the voltage output from the input and rectifying unit is filtered by the electrolytic capacitor.

2. The smart sine wave step-down converter according to claim 1, wherein the first switching tube, the second switching tube and the third switching tube are N-channel MOS tubes.

3. The smart sine wave step-down converter according to claim 1, further comprising an MCU controlling unit, wherein the grid of the first switching tube, the grid of the second switching tube, the grid of the third switching tube and the control terminal of the inverting paraphase unit are respectively connected to the MCU controlling unit, and the MCU controlling unit outputs the two-path anti-phased PWM pulse signals to the grid of the second switching tube and the grid of the third switching tube, controls the on/off state of the third switching tube and controls the inverting paraphase unit to execute conversion.

4. The smart sine wave step-down converter according to claim 3, further comprising an AC sampling unit, wherein the AC sampling unit comprises an input terminal connected to the input and rectifying unit and an output terminal connected to the MCU controlling unit, the AC sampling unit is configured to collect a voltage value and a phase of the mains voltage and then transmit them to the MCU controlling unit, the MCU controlling unit is configured to control the inverting paraphase unit to execute inversion according to the phase of the mains voltage collected by the AC sampling unit so that the inverting paraphrase unit outputs the sine AC voltage having the same phase as the mains voltage, and is configured to determine whether the mains voltage exceeding the preset value according to the voltage value collected by the AC sampling unit:
if the preset value is exceeded, the MCU controlling unit loads the two-path anti-phased PWM pulse signals to the grid of the first switching tube and the grid of the second switching tube respectively, and loads the driving voltage to the grid of the third switching tube;
if the preset value isn't exceeded, the MCU controlling unit controls the first switching tube to maintain on-switched, and lowers the voltage of the grid of the third switching tube.

5. The smart sine wave step-down converter according to claim 4, wherein when determining that the mains voltage exceeds the present value, the MCU controlling unit controls the third switching tube to be on-switched at the zero-crossing point of the mains voltage according to the phase of the mains voltage collected by the AC sampling unit.

6. The smart sine wave step-down converter according to claim 5, wherein the AC sampling unit comprises an operational amplifier and a comparator, two input terminals of the operational amplifier are respectively connected to the live and zero lines of the input and rectifying unit via their corresponding current-limiting sampling resistors, and the output terminal of the operational amplifier is connected to the MCU controlling unit so that the voltage value of the mains voltage is obtained after the MCU controlling unit calculating the voltage signal output from the operational amplifier.

7. The smart sine wave step-down converter according to claim 6, wherein the output terminal of the operational amplifier is further connected to the anti-phased terminal of the comparator, the in-phased terminal of the comparator is connected to a reference voltage, and the output terminal of the comparator is connected to the MCU controlling unit, and the MCU controlling unit is configured to obtain the phase of the mains voltage according to the voltage signal output from the comparator.

8. The smart sine wave step-down converter according to claim 4, wherein the back end of the inductor is connected to a voltage sampling unit that has an output terminal connected to the MCU controlling unit, and the voltage sampling unit is configured to collect the DC voltage outputted from the back end of the inductor and then transmit it to the MCU controlling unit.

9. The smart sine wave step-down converter according to claim 4, further comprising a current sampling unit which comprises a current transformer, wherein the primary winding of the current transformer is connected between the front end of the inductor and the source of the first switching tube, and the current signal of the secondary winding of the current transformer is rectified and then transmitted to the MCU controlling unit, wherein the MCU controlling unit controls both the first switching tube and the second switching tube to be cut-off when the current of the secondary winding of the current transformer exceeds a preset value.

10. The smart sine wave step-down converter according to claim 5, wherein the inverting paraphase unit comprises an inverter bridge comprising a fourth switching tube, a fifth switching tube, a sixth switching tube and a seventh switching tube, wherein the grid of the fourth switching tube, the grid of the fifth switching tube, the grid of the sixth switching tube and the grid of the seventh switching tube are respectively connected to the MCU controlling unit, and the MCU controlling unit is configured to control the fourth switching tube, the fifth switching tube, the sixth switching tube and the seventh switching tube to be on-switched or off-switched in order to the inverting paraphrase unit output the sine AC voltage.

* * * * *